(12) United States Patent
Cao

(10) Patent No.: US 11,027,665 B1
(45) Date of Patent: Jun. 8, 2021

(54) ELECTRONIC DEVICE HOLDER

(71) Applicant: Shenzhen Xinyuan Electronic Commerce Co., Ltd., Shenzhen (CN)

(72) Inventor: Jingbin Cao, Shenzhen (CN)

(73) Assignee: Shenzhen Xinyuan Electronic Commerce Co., Ltd., Shenzhen (CN)

( * ) Notice: Subject to any disclaimer, the term of this patent is extended or adjusted under 35 U.S.C. 154(b) by 0 days.

(21) Appl. No.: 17/037,770

(22) Filed: Sep. 30, 2020

(30) Foreign Application Priority Data

Aug. 31, 2020 (CN) .......................... 202010903063.3
Aug. 31, 2020 (CN) .......................... 202021872670.X

(51) Int. Cl.
*B60R 11/02* (2006.01)
*F16B 2/12* (2006.01)
*B60R 11/00* (2006.01)

(52) U.S. Cl.
CPC ............ *B60R 11/0241* (2013.01); *F16B 2/12* (2013.01); *B60R 2011/0071* (2013.01)

(58) Field of Classification Search
USPC .... 248/448, 451, 447.2, 154, 229.2, 229.22, 248/316.4, 316.6, 316.1
See application file for complete search history.

(56) References Cited

U.S. PATENT DOCUMENTS

| 8,998,048 | B1 * | 4/2015 | Wu | .......................... F16M 13/00 |
| | | | | 224/420 |
| 10,259,400 | B1 * | 4/2019 | Song | ................... B60R 11/0235 |
| 10,598,199 | B1 * | 3/2020 | Fan | .......................... B60R 11/02 |
| 2020/0191178 | A1 * | 6/2020 | Yang | .......................... F16B 2/02 |
| 2020/0252494 | A1 * | 8/2020 | Li | ............................. H04M 1/04 |

\* cited by examiner

*Primary Examiner* — Alfred J Wujciak
(74) *Attorney, Agent, or Firm* — Andrew C. Cheng

(57) ABSTRACT

The present invention relates to an electronic device holder. The electronic device holder includes a housing, at least two clamping arms, and at least one adjusting arm. One of the at least two clamping arms is slidably connected to the housing. A clamping arm at least slidably connected to the housing is connected with an adjusting arm. The adjusting arm is slidably connected to the housing. The housing includes a first housing and a second housing. The adjusting arm can be driven to slide so that the relative movement of the first housing and the second housing drives the at least two clamping arms to open or clamp. By providing the adjusting arm, a pushing block and an elastic element, the clamping arms can be driven to open for placement of the electronic device. The structure is simple, the manufacturing cost is low, and the operation is convenient and quick.

15 Claims, 8 Drawing Sheets

ELECTRONIC DEVICE HOLDER

TECHNICAL FIELD

The present invention relates to the technical field of electronic device fittings, and particularly, relates to an electronic device holder.

BACKGROUND

A vehicle-mounted holder is used as a clamping tool for a mobile phone in a vehicle, which is loved by the majority of vehicle owners because of its advantages of clamping the mobile phone in the vehicle and facilitating the operation of the mobile phone by the user.

Most of the vehicle-mounted holders on the market enable the clamping of the mobile phone by the clamping arms through linkage of gear structures, which have a highly complex structure, and the operation is inconvenient.

SUMMARY

In order to overcome the technical problems of complex structure and high cost of the existing electronic device holder, the present invention provides an electronic device holder.

In order to solve the above-mentioned technical problems, the present invention provides the following technical solution. An electronic device holder includes a housing, at least two clamping arms, and at least one adjusting arm; wherein one of the at least two clamping arms is slidably connected to the housing, a clamping arm at least slidably connected to the housing is connected to an adjusting arm, the adjusting arm is slidably connected to the housing; the housing includes a first housing and a second housing that are movably connected, the adjusting arm can be driven to slide so that the relative movement of the first housing and the second housing drives the at least two clamping arms to open or clamp.

Preferably, the electronic device holder further includes at least one pushing block arranged in the housing, and an elastic element connected with the clamping arms and/or the adjusting arm, the pushing block and the elastic element being opposite. The adjusting arm can be driven to slide so that the elastic element stretches and pushes the pushing block to move, so that the first housing and the second housing move away from each other and the at least two clamping arms are oppositely opened.

Preferably, the clamping arm and adjusting arm connected to each other extend in opposite directions relative to the housing.

Preferably, the electronic device holder further includes a locking block arranged in the housing. When the first housing and the second housing move away from each other, an end of the clamping arm can abut against an end of the locking block to limit. When the first housing is pushed to be close to the second housing, the clamping arm is separated from the locking block so that the at least two clamping arms approach to each other and clamp the electronic device.

Preferably, the first housing is a front housing, the pushing block is arranged on the first housing. The locking block is in the shape of a hook, and a cavity is formed between the locking block and the first housing for the clamping arm to pass through. When the first housing and the second housing move away from each other, the clamping arm slides out of the cavity and the clamping arm abuts against the end of the locking block. When the first housing is pushed to be close to the second housing, the clamping arm is separated from the end of the locking block and returns into the cavity.

Preferably, the clamping arm or the adjusting arm slidably connected to the housing is provided with a limiting groove and a first limiting block slidably connected in the limiting groove, and the extension direction of the limiting groove is identical with the sliding direction of the clamping arm. When the first limiting block abuts against the end of the limiting groove close to the center of the housing, the clamping arm abuts against the end of the locking block.

Preferably, two clamping arms are provided. The two clamping arms are slidably connected to the housing, each clamping arm is correspondingly connected with an adjusting arm, and each of two ends of the elastic element in its elastic direction is connected with a clamping arm.

Preferably, a connecting pillar is provided on one of the first housing and the second housing, and a fastener is provided on the other of the first housing and the second housing; and the fastener passes through the first housing or the second housing to connect with the connecting pillar.

Preferably, the first housing and the second housing are provided with adjusting hooks with opposite bending directions. When the adjusting hooks of the first housing and the second housing are engaged, the first housing and the second housing move to their respective extreme positions.

Preferably, the housing is provided with openings for the clamping arms and the adjusting arm to extend out, and a plurality of second limiting blocks are arranged in the housing, and at least two second limiting blocks are arranged oppositely to form a space for placing the adjusting arm, and a second limiting block corresponding to the first limiting block is arranged to form a space for placing the clamping arm.

Preferably, the second limiting block includes a movement portion and a hook portion. The movement portion is connected with the sides of the clamping arm and the adjusting arm that have thickness dimensions, and the hook portion is clamped on the surfaces of the clamping arm and the adjusting arm that have width dimensions. Two adjusting arms are provided, and the two adjusting arms are overlapped. A guiding groove is provided along the sliding direction of the adjusting arm located at a lower position, and the hook portion is clamped in the guiding groove.

Preferably, the electronic device holder further includes a support arm arranged at the bottom of the housing.

Preferably, the support arm is slidably connected to the housing, and the housing is provided with gear grooves and gear plates. The support arm includes a main body, an adjusting plate provided on the main body, and a latching block provided on the adjusting plate. The adjusting plate can be pressed so that the main body abuts against different gear plates and the latching block is locked into the different gear grooves to adjust the position of the support arm relative to the housing.

Preferably, a buffering element is provided at a position where the clamping arm is connected to the electronic device.

Preferably, the second housing is a rear housing, and a connecting element is provided on the second housing.

Compared with the prior art, the electronic device holder provided by the present invention has the following beneficial effects.

1. An electronic device holder includes a housing, at least two clamping arms, and at least one adjusting arm. One of the at least two clamping arms is slidably connected to the housing, a clamping arm at least slidably connected to the housing is connected to an adjusting arm, and the adjusting arm is slidably connected to the housing. The housing includes a first housing and a second housing that are movably connected, and the adjusting arm can be driven to slide so that the relative movement of the first housing and the second housing drives the at least two clamping arms to open or clamp. The clamping arms can be driven to open for the placement of an electronic device by setting the adjusting arm, a pushing block and an elastic element. The structure is simple, the manufacturing cost is low, and the operation is convenient and quick.

2. The electronic device holder also includes at least one pushing block arranged in the housing, and an elastic element connected with the clamping arms and/or the adjusting arm; and the pushing block and the elastic element are opposite. The adjusting arm can be driven to slide to make the elastic element stretch and push the pushing block to move, so that the first housing and the second housing move away from each other and the at least two clamping arms are opened relative to each other. Providing the pushing block and the matched elastic element is convenient for driving the pushing block to move the first housing and the second housing relative to each other through the stretching of the elastic element. The elastic element not only serves to make the clamping arms oppositely clamp the electronic device, but also functions as a force source for driving the first housing and the second housing to move relative to each other. The elastic element integrates multiple functions, which can reduce the number of the fittings of the electronic device holder and reduce the manufacturing cost.

3. The electronic device holder also includes a locking block arranged in the housing. When the first housing and the second housing move away from each other, the end of the clamping arm can abut against the end of the locking block to limit. When the first housing is pushed to be close to the second housing, the clamping arm is separated from the locking block so that the at least two clamping arms approach to each other and clamp the electronic device. Providing the locking block can limit the opened clamping arms, so as to place the electronic device. In the process of placing the electronic device, the clamping arm and the locking block may be disengaged from each other under the pushing force of the electronic device on the housing, so that the clamping arms clamp the electronic device, which is simple and quick in operation.

4. The first housing is a front housing, and the pushing block is arranged on the first housing. The locking block is in the shape of a hook, and a cavity is formed between the locking block and the first housing for a clamping arm to pass through. When the first housing and the second housing move away from each other, the clamping arm slides out of the cavity and the clamping arm abuts against an end of the locking block. When the first housing is pushed to be close to the second housing, the clamping arm is separated from the end of the locking block and returns into the cavity. The locking block is set in a hook shape, which can not only serve as a limitation on the clamping arm, but also guide the sliding of the clamping arm, so that the sliding of the clamping arm is relatively stable and the service life of the electronic device holder is prolonged.

5. The clamping arm or the adjusting arm slidably connected to the housing is provided with a limiting groove and a first limiting block slidably connected in the limiting groove. The extension direction of the limiting groove is identical with the sliding direction of the clamping arm. When the first limiting block abuts against an end of the limiting groove close to the center of the housing, the clamping arm abuts against the end of the locking block. By providing the limiting groove, the user can conveniently know the time of pushing the adjusting arm to a proper position, namely, a position where the end of the clamping arm corresponds to the end of the locking block, and the user can be informed that he/she can release the adjusting arm, further improving the user's operational flexibility.

6. The first housing and the second housing are provided with adjusting hooks with opposite bending directions. When the adjusting hooks of the first housing and the second housing are engaged, the first housing and the second housing move to their respective extreme positions. Providing the adjusting hooks can avoid excessive displacement of the first housing relative to the second housing when the fastener is loosened during long-term use, prolonging the service life of the electronic device holder.

REFERENCE SIGNS IN FIGURES

10: electronic device holder; 11: housing; 111: first housing; 112: second housing; 12: clamping arm; 13: adjusting arm; 131: guiding groove; 14: pushing block; 15: elastic element; 16: locking block; 17: first limiting block; 171: second limiting block; 1711: movement portion; 1712: hook portion; 18: limiting groove; 19: opening; 20: connecting pillar; 21: fastener; 22: adjusting hook; 23: support arm; 231: main body; 232: adjusting plate; 233: key; 234: latching block; 235: gear groove; 236: gear plate; 237: throughhole; 24: buffering element; 25: connecting element; 26: first connecting plate; and 27: second connecting plate.

DESCRIPTION OF EMBODIMENTS

In order to make the objects, technical solutions and advantages of the present invention clearer, the present invention is further described in detail below with reference to the accompanying drawings and embodiments. It should be understood that the specific embodiments described herein are only intended to explain the present invention instead of limiting the present invention.

It should be noted that when an element is referred to as being "fixed to" another element, the element may be directly disposed on another element or there may be an intermediate element. When an element is regarded as being "connected to" another element, the element may be directly connected to another element or there may be an intermediate element. The terms "perpendicular", "horizontal", "left", "right" and similar expressions used herein are merely for the purpose of illustration.

Figure 1:
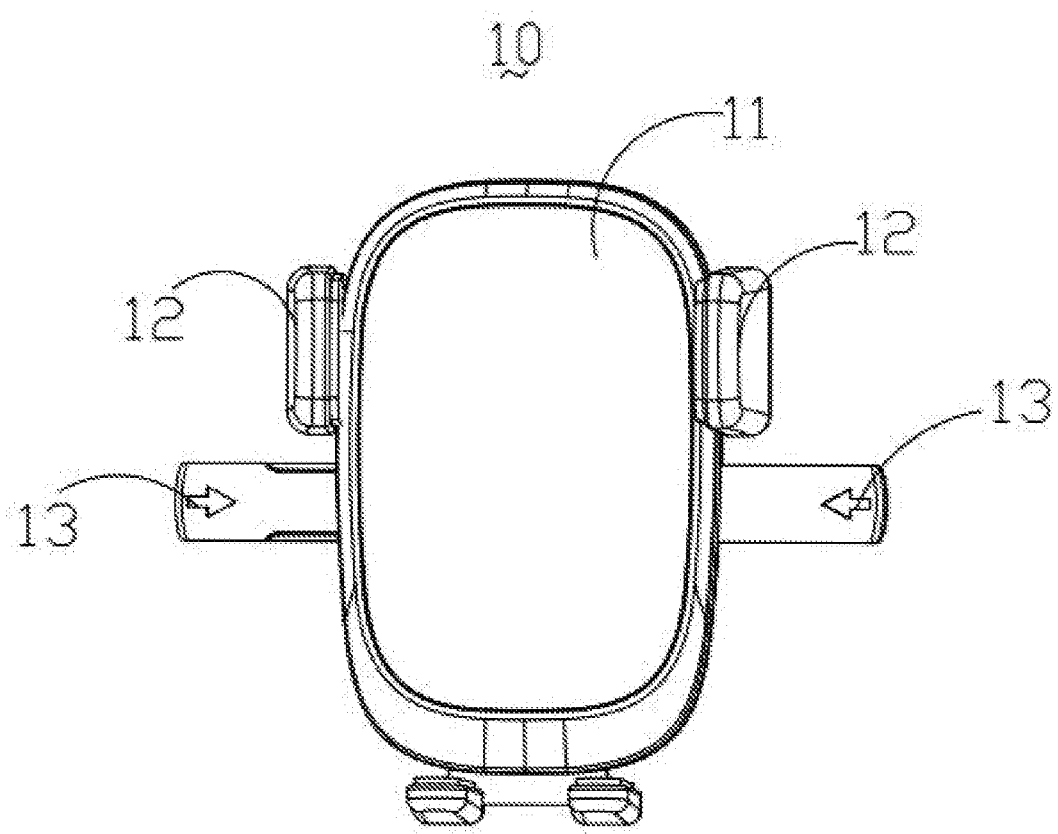
FIG. 1 is a schematic structural diagram of an electronic device holder provided by the present invention in a clamping state.
Figure 2:
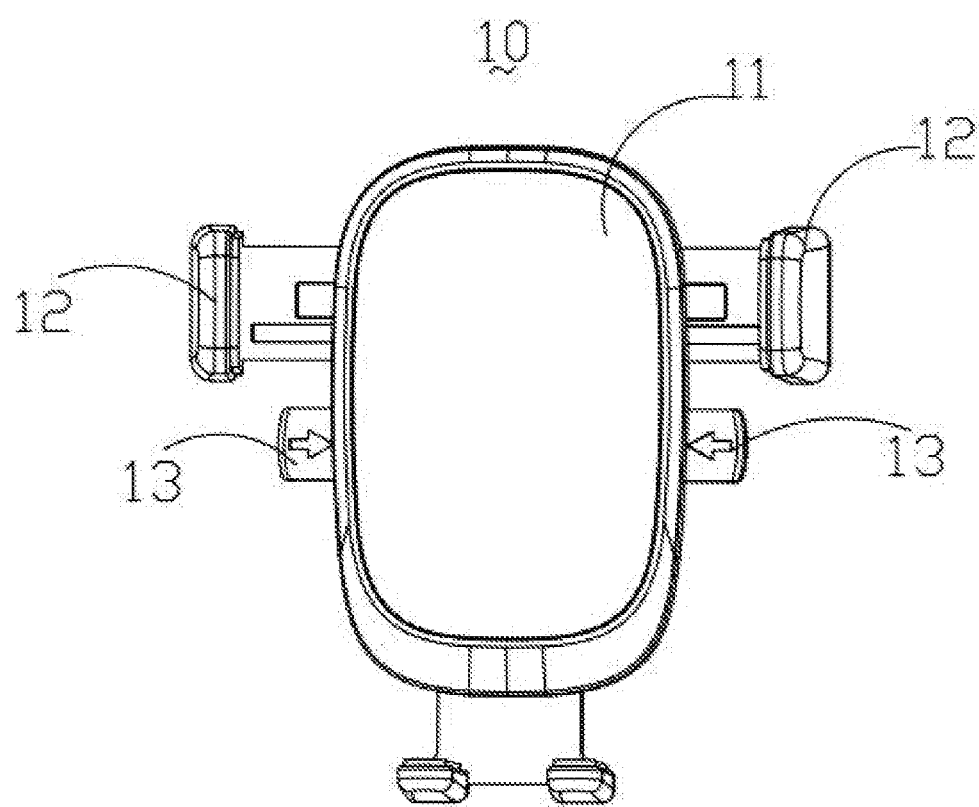
FIG. 2 is a schematic structural diagram of the electronic device holder provided by the present invention in an open state.

Referring to FIGS. 1 and 2, the present invention provides an electronic device holder 10, which includes a housing 11, at least two clamping arms 12, and at least one adjusting arm 13. The housing 11 is formed with a space for accommodating the clamping arms 12 and the adjusting arm 13, and openings for the clamping arms 12 and the adjusting arm 13 to extend out. One of the at least two clamping arms 12 is slidably connected to the housing 11, and the clamping arm 12 at least slidably connected to the housing 11 is connected with the adjusting arm 13, and the adjusting arm 13 is slidably connected with the housing 11. A space for placing an electronic device is formed between the at least two clamping arms 12. By driving the adjusting arm 13 to slide, the relative movement of the first housing 111 and the second housing 112 drives the at least two clamping arms 12 to open or clamp. By driving the adjusting arm 13 to slide, the clamping arms 12 slide, thereby adjusting the size of the space formed between at least two clamping arms 12 to clamp the electronic device or loosen and remove the electronic device. As shown in FIG. 1, the electronic device is in an unclamped state. When the electronic device needs to be clamped, the adjusting arm 13 is pushed in a direction towards the center of the housing 11, so that the adjusting arm 13 pushes the clamping arms 12 away from each other, there by forming a space for placing the electronic device, as a state shown in FIG. 2. At this time, the electronic device is placed on the holder, and at least two clamping arms 12 clamp the electronic device under a force exerted by the electronic device or an external force.

In some specific embodiments, the number of clamping arms 12 may be set to 2, 3, 4, or others. At least two clamping arms 12 arranged oppositely need to be included, which can clamp the electronic device well. When there are more than two clamping arms, they may be oppositely arranged in pairs of two, or other clamping arm(s) 12 more than two may be arranged on one side to clamp the electronic device more firmly.

In some specific embodiments, when all of the clamping arms 12 are slidably connected with the housing 11, each clamping arm 12 may be connected with an adjusting arm 13. In order to better realize that the clamping arms 12 are adjusted to slide away from each other when a force is applied to the adjusting arms 13, the extension directions of two adjusting arms 13 connected with the clamping arms 12 are opposite. That is, the clamping arm 12 on the left of the housing 11 is connected to the adjusting arm 13 on the right of the housing 11, and the clamping arm 12 on the right of the housing 11 is connected to the adjusting arm 13 on the left of the housing 11. Left and right are only locations relative to the housing 11, but do not constitute a restriction on the product structure.

In this embodiment, in order to increase the speed of opening the clamping arms 12 that are arranged oppositely, the clamping arms 12 slidably connected with the housing 11 are each provided with an adjusting arm 13 respectively. In this way, when two oppositely arranged adjusting arms are pressed to move toward each other, the two clamping arms 12 arranged oppositely move away from each other simultaneously, so that the space formed by the two clamping arms 12 can quickly achieve the space for accommodating the electronic device, thereby improving the convenience of operation.

Optionally, in this embodiment, two clamping arms 12 are provided. The two clamping arms 12 are slidably connected with the housing 11, and each clamping arm 12 is correspondingly connected with an adjusting arm 13. In the following embodiments, specific description is made when the number of the clamping arms 12 is set to two and the number of the adjusting arms 13 is also set to two.

Figure 3:
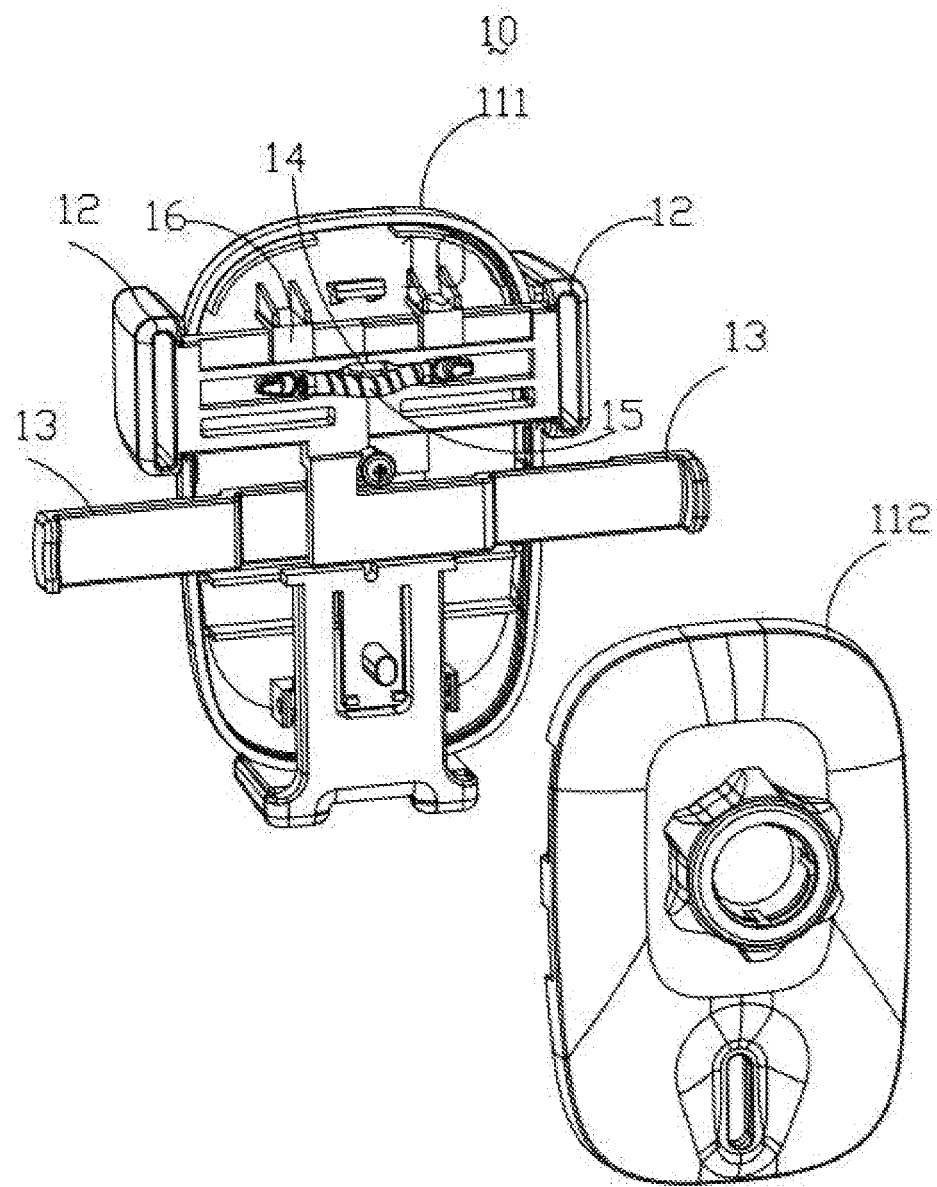
FIG. 3 is a schematic exploded structural diagram of the electronic device holder provided by the present invention.
Figure 4:
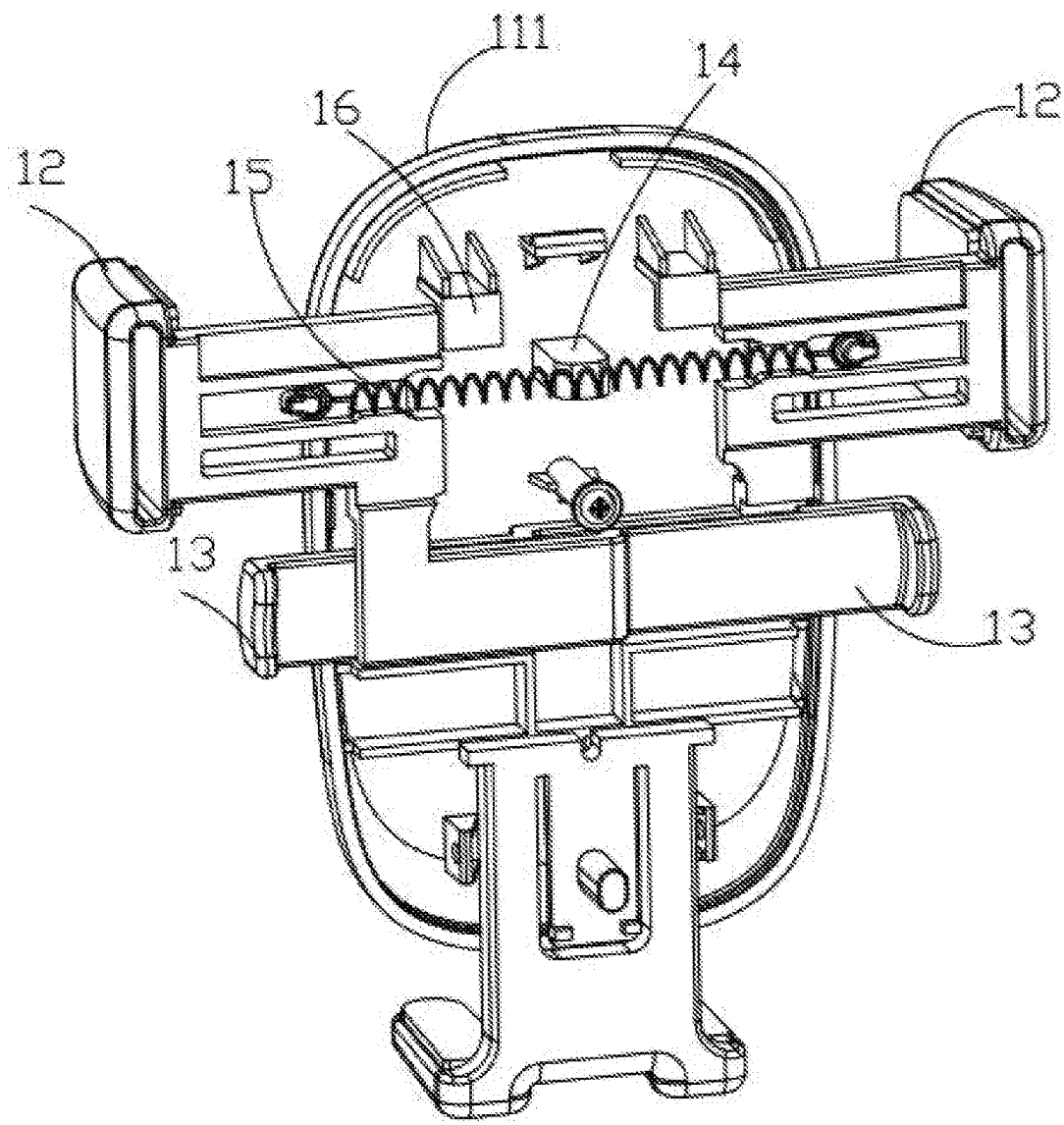
FIG. 4 is a schematic exploded structural diagram of a front housing matched with the clamping arms and the adjusting arm of the electronic device holder provided by the present invention.

Referring to FIGS. 3 and 4, the housing 11 includes a first housing 111 and a second housing 112 connected to each other. The first housing 111 and the second housing 112 are movably connected, so that the first housing 111 and the second housing 112 may move relative to each other, that is, the first housing 111 moves a certain distance relative to the second housing 112 in the direction along which the electronic device is inserted. The first housing 111 is a front housing and is fitted to the electronic device, and the second housing 112 is a rear housing. The electronic device holder 10 further includes a pushing block 14 and an elastic element 15 arranged in the housing 11. The pushing block 14 is disposed on the first housing 111 and is formed by protruding toward the second housing 112 along an inner wall of the first housing 111. The elastic element 15 is opposite to the pushing block 14. When the elastic element 15 is in a natural state, the elastic element 15 is placed on a front end of the pushing block 14 in a curved shape. When the elastic element 15 is in a stretched state, the elastic element 15 abuts against the front end of the pushing block 14 and exerts a pushing force on the pushing block 14, and the direction of the pushing force is away from the second housing 112. The elastic element 15 is elastically connected to the clamping arms 12. Both ends of the elastic element 15 in the elastic direction are each connected to a clamping arm 12. When the two adjusting arms 13 are driven to be close to each other, the two clamping arms 12 are opened and the elastic element 15 is in the stretched state. The elastic element 15 is abutted against the end surface of the pushing block 14, and exerts a pushing force on the pushing block 14 in a direction away from the second housing 112, thereby pushing the first housing 111 away from the second housing 112.

As a variant, the elastic element 15 may be connected with the adjusting arms 13 while the pushing block 14 is opposed to the elastic element 15. In this case, the elastic element 15 may be or may not be provided on the clamping arms 12. In order to ensure the clamping effect of the clamping arms 12 on the electronic device, the elastic element 15 is provided on the clamping arms 12. When the clamping arms 12 are provided with the elastic element 15, a pushing block 14 is correspondingly provided or no pushing block 14 is provided.

In some specific embodiments, the elastic element 15 is an elastic piece, such as a spring, a torsion spring, or an elastic rubber pillar.

Continuing with reference to FIGS. 3 and 4, the electronic device holder 10 further includes a locking block 16 disposed on the first housing 111. The locking block 16 protrudes from the inner wall of the first housing 111, and has a hook-like structure. A cavity for the clamping arm 12 to slide through is formed between the locking block 16 and the first housing 111, and the locking block 16 hooks the clamping arm 12 to limit and guides the clamping arm 12 to some extent. When the clamping arms 12 are driven by the adjusting arm 13 to slide to their respective extreme positions away from each other, the elastic element 15 is in the stretched state. After the elastic element 15 is pushed by a certain distance by the pushing block 14, the end of the clamping arm 12 moves out of the cavity of the locking block 16, such that the end of the clamping arm 12 abuts against the side surface of the locking block 16, which restricts the relative movement of the clamping arms 12. At this time, the user can place the electronic device. When the electronic device is put, the first housing 111 is pushed to move toward the second housing 112 under the pushing force of the electronic device, so that the clamping arm 12 is separated from the end of the locking block 16 and returns to the cavity formed by the locking block 16 and the first housing 111. At this time, the elastic element 15 is still in the stretched state, and the at least two clamping arms 12 clamp the electronic device.

As a variant, the locking block 16 and the pushing block 14 may be arranged on the second housing 112. In this way, when the electronic device needs to be clamped, by manually applying a force on the second housing 112 in a direction toward the first housing 111, the end of the clamping arm 12 is separated from the locking block 16.

Figure 5:
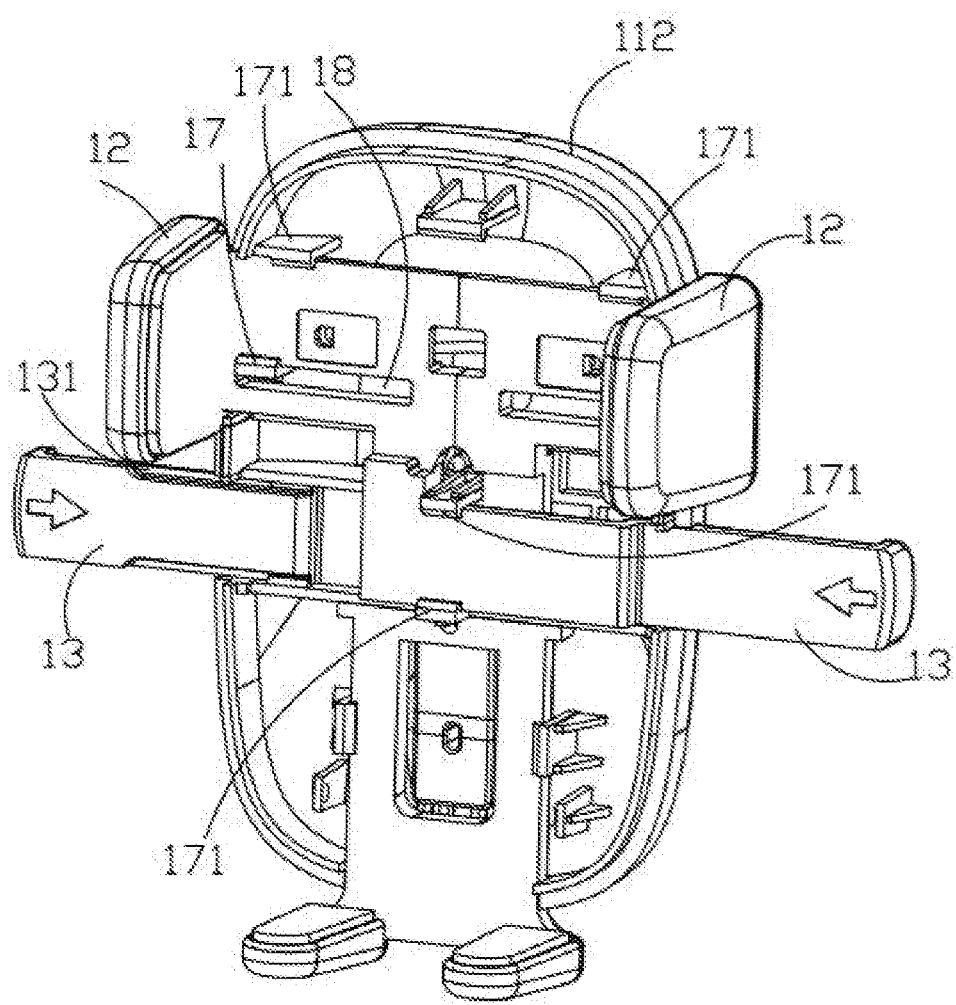
FIG. 5 is a schematic exploded structural diagram of a rear housing matched with the clamping arms and the adjusting arm of the electronic device holder provided by the present invention.

Referring to FIG. 5, the clamping arm 12 slidably connected to the housing 11 is provided with a limiting groove 18 and a first limiting block 17 slidably connected into the limiting groove 18. Optionally, the first limiting block 17 is provided on the second housing 112. The extension direction of the limiting groove 18 is identical with the sliding direction of the clamping arm 12. When the clamping arms 12 are relatively away from each other with the maximum distance, the first limiting block 17 abuts against an end of the limiting groove 18 close to the center of the housing 11. At this time, the clamping arm 12 slides out of the locking block 16. When the operating force on the adjusting arm 13 is removed, the end of the clamping arm 12 abuts against the end surface of the locking block 16, thereby restricting the movement of the clamping arm 12.

As a variant, the limiting groove 18 may be provided on the adjusting arm 13, and the first limiting block 17 corresponds to the limiting groove 18.

Figure 6:
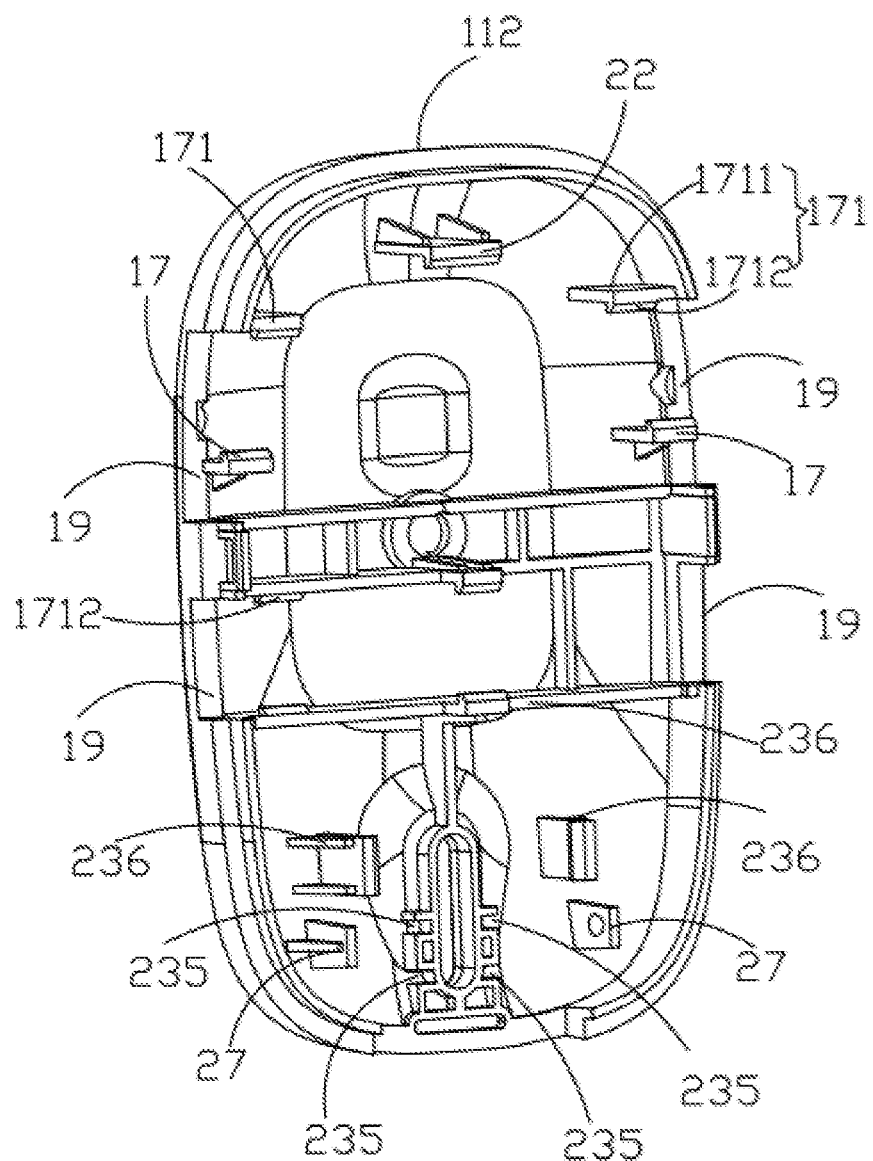
FIG. 6 is a schematic structural diagram of the rear housing of the electronic device holder provided by the present invention.

Referring to FIG. 6, the housing 11 is provided with openings 19 through which the clamping arms 12 and the adjusting arm 13 extend. The housing 11 is also provided with at least one second limiting block 171. The first limiting block 17 and the second limiting block 171 are arranged oppositely. The clamping arm 12 is slidably connected within a space formed by the first limiting block 17 and the second limiting block 171.

Continuing with reference to FIG. 6, the second limiting block 171 includes a movement portion 1711 and a hook portion 1712. The movement portion 1711 is connected with the sides of the clamping arm 12 and the adjusting arm 13 which have thickness dimensions, and the hook portion 1712 is clamped on the surfaces of the clamping arm 12 and the adjusting arm 13 which have width dimensions. Likewise, in order to limit the adjusting arms 13, opposite second limiting block 171 are provided at the positions corresponding to the adjusting arms 13.

Continuing with reference to FIGS. 5 and 6, two adjusting arms 13 are provided. The two adjusting arms 13 are overlapped with each other, so that the extension length of the adjusting arms 13 can be reduced. The hook portion 1712 is clamped on the surface of the adjusting arm 13 located at an upper position. A guiding groove 131 is provided in the sliding direction of the adjusting arm 13 located at a lower position, and the hook portion 1712 is clamped in the guiding groove 131. Providing the guiding groove 131 matched with the hook portion 1712 can further ensure the sliding stability of the adjusting arm 13.

Figure 7:
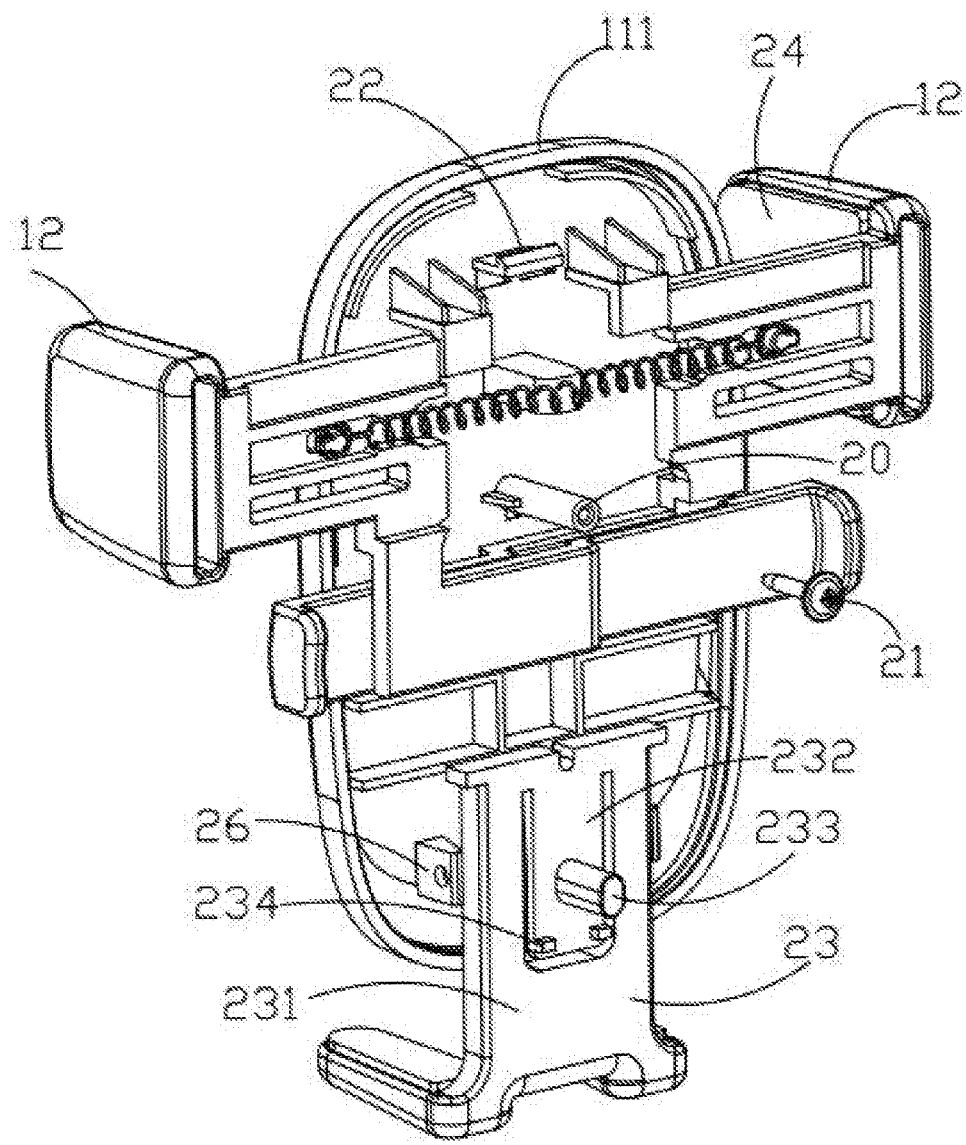
FIG. 7 is another schematic exploded structural diagram of the front housing matched with the clamping arms and the adjusting arm of the electronic device holder provided by the present invention.

Referring to FIGS. 6 and 7, a first connecting plate 26 is provided on the first housing 111, a second connecting plate 27 is provided on the second housing 112. The first connecting plate 26 and the second connecting plate 27 are arranged oppositely and at the bottoms of the first housing 26 and the second housing 27. The first connecting plate 26 and the second connecting plate 27 may be connected by a connecting shaft or other element, thereby connecting the first housing 111 and the second housing 112. The first housing 111 and the second housing 112 may rotate relative to each other within a certain range. The first connecting plate 26 and the second connecting plate 27 are arranged on the bottom of the housing 11, and no locking element is arranged on the top of the housing 11, so that the first housing 111 and the second housing 112 may be away from or close to each other.

Referring to FIG. 7, a connecting pillar 20 is provided on one of the first housing 111 and the second housing 112, and a fastener 21 is provided on the other of the first housing 111 and the second housing 112. The connecting pillar 20 and the fastener 21 are arranged approximately at the middle of the housing 11. In this embodiment, the connecting pillar 20 is arranged on the first housing 111, and the fastener 21 passes through the second housing 112 and is connected to the connecting pillar 20 arranged on the first housing 111. In order to ensure that the first housing 111 can move relative to the second housing 112, the fastener 21 is not completely locked when the fastener 21 is connected with the connecting pillar 20, so as to ensure relative movement between the first housing 111 and the second housing 112. The fastener 21 is connected with the connecting pillar 20 such that the first housing 111 and the second housing 112 are movably connected. The connecting pillar 20 and the fastener 21 may be connected in a threaded manner. The fastener 21 includes a screw and a washer, and the washer is clamped on the second housing 112.

Continuing with reference to FIGS. 6 and 7, the first housing 111 and the second housing 112 are provided with adjusting hooks 22 that engage with each other, and the hook opening directions of the adjusting hooks 22 on the first housing 111 and the second housing 112 are opposite. That is, the adjusting hook 22 on the first housing 111 is bent upward, and the adjusting hook 22 on the second housing 112 is bent downward. Providing the adjusting hooks 22 on the first housing 111 and the second housing 112 which are matched with each other can well limit the sliding distance of the first housing 111 and the second housing 112 relative to each other. When the adjusting hooks 22 on the first housing 111 and the second housing 112 are engaged, the first housing 111 and the second housing 112 move to their respective extreme positions. In order to ensure that the first housing 111 and the second housing 112 can move away from or approach to each other smoothly, the adjusting hooks 22 are arranged on the first housing 111 and the second housing 112 close to the top.

It can be understood that, either of the cooperation of the connecting pillar 20 and the fastener 21 for limiting and the limit through the two adjusting hooks 22 is possible. When both are provided, the two can cooperate with each other to limit better. Especially, when the fastener 21 is worn out during long-term use, its fastening performance is reduced, the separation and damage of the first housing 111 and the second housing 112 can be well avoided through the adjusting hooks 22.

Referring to FIGS. 6 and 7 again, the electronic device holder 10 further includes a support arm 23 disposed at the bottom of the housing 11. The support arm 23 supports the bottom of the electronic device and cooperates with the clamping arms 12 to better clamp the electronic device.

In order to adapt to different sizes of electronic devices, the support arm 23 is slidably connected to the housing 11 to adjust the distance between the bottom of the support arm 23 relative to the housing 11. The second housing 112 is provided with a plurality of gear grooves 235 and gear plates 236, so that the support arm 23 is clamped and fixed at different gear grooves 235 to realize the adjustment of gears. The gear grooves 235 are arranged on the second housing 112 in a multi-row arrangement, and the square arrangement of the gear grooves 235 is consistent with the sliding direction of the support arm 23. In this embodiment, the gear grooves 235 is provided in two rows, each row is provided with two gear grooves 235, and the openings of the gear grooves 235 face the sides of the housing 11.

Continuing with reference to FIGS. 6 and 7, the support arm 23 includes a main body 231, an adjusting plate 232 provided on the main body 231, a key 233 provided on the adjusting plate 232, and a latching block 234 provided on the adjusting plate 232. The adjusting plate 232 is formed by cutting some cracks along the main surface of the main body 231, and one end of the adjusting plate 232 is kept connected with the main body 231, so that the adjusting plate 232 may move relative to the main body 231, that is, pop out or pop into the main body 231. The latching block 234 is arranged at the bottom of the adjusting plate 232, and the number thereof corresponds to the number of the gear grooves 235. When the gear needs to be adjusted, the key 233 is pressed to move the adjusting plate 232 away from the second housing 112, so that the latching block 234 is disengaged from the gear grooves 235 and slide to the gear plate 236. Then the key 233 is released, so that the latching block 234 falls into the gear grooves 235 again. The adjusting plate 232 is adjusted to slide the main body 231, so that the latching block 234 can be engaged into the different gear grooves 235.

Figure 8:
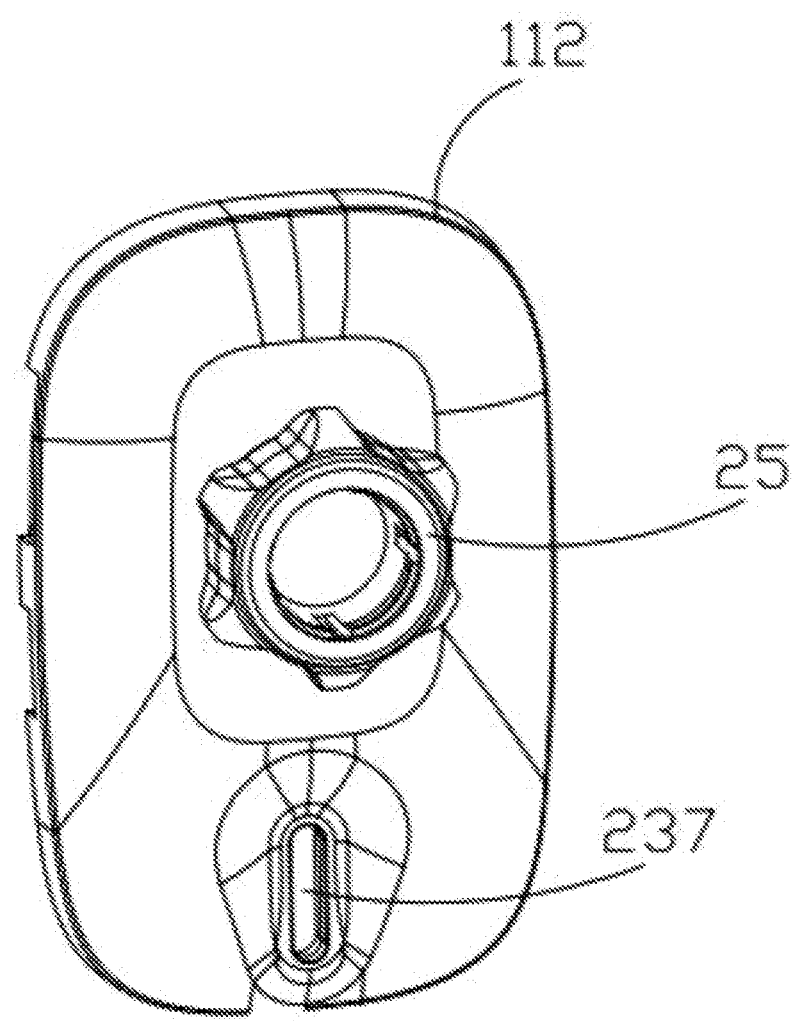
FIG. 8 is another schematic structural diagram of the rear housing of the electronic device holder provided by the present invention.

Referring to FIG. 8, a through hole 237 is provided on the second housing 112, and the key 233 passes through the through hole 237. A connecting element 25 is provided on the second housing 112. The fixed connection between the electronic device holder 10 and the outside is realized by the connecting element 25.

Referring to FIG. 7 again, a buffering element 24 is provided at the position where the clamping arm 12 is connected with the electronic device. The buffering element 24 is sponge, soft rubber, silicone rubber or other flexible material.

Compared with the prior art, the electronic device holder has the following beneficial effects.

1. An electronic device holder includes a housing, at least two clamping arms, and at least one adjusting arm. One of the at least two clamping arms is slidably connected to the housing, a clamping arm at least slidably connected to the housing is connected to an adjusting arm, and the adjusting arm is slidably connected to the housing. The housing includes a first housing and a second housing that are movably connected, and the adjusting arm can be driven to slide, so that the relative movement of the first housing and the second housing drives the at least two clamping arms to open or clamp. The clamping arms can be driven to open for the placement of an electronic device by setting the adjusting arm, a pushing block and an elastic element. The structure is simple, the manufacturing cost is low, and the operation is convenient and quick.

2. The electronic device holder also includes at least one pushing block arranged in the housing, and an elastic element connected with the clamping arms and/or the adjusting arm; and the pushing block and the elastic element are opposite. The adjusting arm can be driven to slide to make the elastic element stretch and push the pushing block to move, so that the first housing and the second housing move away from each other and the at least two clamping arms are opened relative to each other. Providing the pushing block and the matched elastic element is convenient for driving the pushing block to move the first housing and the second housing relative to each other through the stretching of the elastic element. The elastic element not only serves to make the clamping arms oppositely clamp the electronic device, but also functions as a force source for driving the first housing and the second housing to move relative to each other. The elastic element integrates multiple functions, which can well reduce the number of the fittings of the electronic device holder and reduce the manufacturing cost.

3. The electronic device holder also includes a locking block arranged in the housing. When the first housing and the second housing move away from each other, the end of the clamping arm can abut against the end of the locking block to limit. When the first housing is pushed to be close to the second housing, the clamping arms are separated from the locking blocks so that the at least two clamping arms approach to each other and clamp the electronic device. Providing the locking blocks can well limit the opened clamping arms, so as to place the electronic device. In the process of placing the electronic device, the clamping arms and the locking blocks may be disengaged from each other under the pushing force of the electronic device on the housing, so that the clamping arms clamp the electronic device, which is simple and quick in operation.

4. The first housing is a front housing, and the pushing block is arranged on the first housing. The locking block is in the shape of a hook, and a cavity is formed between the locking block and the first housing for a clamping arm to pass through. When the first housing and the second housing move away from each other, the clamping arm slides out of the cavity and the clamping arm abuts against an end of the locking block. When the first housing is pushed to be close to the second housing, the clamping arm is separated from the end of the locking block and returns into the cavity. The locking block is set in a hook shape, which can not only serve as a limitation on the clamping arm, but also guide the sliding of the clamping arm, so that the sliding of the clamping arm is relatively stable and the service life of the electronic device holder is prolonged.

5. The clamping arm or adjusting arm slidably connected to the housing is provided with a limiting groove and a first limiting block slidably connected in the limiting groove. The extension direction of the limiting groove is identical with the sliding direction of the clamping arm. When the first limiting block abuts against an end of the limiting groove close to the center of the housing, the clamping arm abuts against the end of the locking block. By providing the limiting groove, the user can conveniently know the time of pushing the adjusting arm to a proper position, namely, a position where the end of the clamping arm corresponds to the end of the locking block, and the user can be informed that he/she can release the adjusting arm, further improving the user's operational flexibility.

6. The first housing and the second housing are provided with adjusting hooks with opposite bending directions.

When the adjusting hooks of the first housing and the second housing are engaged together, the first housing and the second housing move to their respective extreme positions. Providing the adjusting hooks can avoid excessive displacement of the first housing relative to the second housing when the fastener is loosened during long-term use, which prolongs the service life of the electronic device holder.

The above are just the preferred embodiments of the present invention, which will not limit the present invention. Any modifications, equivalent replacements and improvements made within the spirits and principles of the present invention shall all fall in the protection scope of the present invention.

What is claimed is:

1. An electronic device holder for supporting an electronic device, comprising:
   A first housing configured to retain the electronic device thereon;
   A connecting pillar mounted on the back of the first housing;
   A second housing, wherein the first and second housing are slidable with respect to each other through the connecting pillar;
   At least two clamping arms mounted in the back of the first housing, wherein the clamping arms clamp on the electronic device when the device is placed on the first housing;
   An adjusting arm mounted in the back of first housing and connected to the clamping arms for extending the clamping arms in an opened position to release the electronic device from the first housing;
   Wherein the clamping arms are in the open position, the electronic device is placed on the first housing and the first housing is slidable toward to the second housing to drive the clamping arms in closed position to clamp the electronic device.

2. The electronic device holder according to claim 1, characterized in that: the electronic device holder further comprises at least one pushing block arranged in the housing, and an elastic element connected to the clamping arms and/or the adjusting arm, and one pushing block is opposed to the elastic element; the adjusting arm can be driven to slide such that the elastic element stretches and pushes the pushing block to move, so that the first housing and the second housing move away from each other and the at least two clamping arms are opened relative to each other.

3. The electronic device holder according to claim 2, characterized in that: the electronic device holder further comprises a locking block arranged in the housing; when the first housing and the second housing move away from each other, an end of the clamping arm can abut against an end of the locking block for limiting; when the first housing is pushed to be close to the second housing, the clamping arm and the locking block are separated, so that the at least two clamping arms are close to each other to clamp an electronic device.

4. The electronic device holder according to claim 3, characterized in that: the first housing is a front housing; the pushing block is arranged on the first housing; the locking block is in the shape of a hook; a cavity is formed between the locking block and the first housing for the clamping arm to pass through; and during the movement of the first housing and the second housing away from each other, the clamping arm slides out of the cavity and abuts against the end of the locking block; and when the first housing is pushed to be close to the second housing, the clamping arm is separated with the end of the locking block and returns into the cavity.

5. The electronic device holder according to claim 3, characterized in that: the first housing is a front housing; the pushing block is arranged on the first housing; the locking block is in the shape of a hook; a cavity is formed between the locking block and the first housing for the clamping arm to pass through; and during the movement of the first housing and the second housing away from each other, the clamping arm slides out of the cavity and abuts against the end of the locking block; and when the first housing is pushed to be close to the second housing, the clamping arm is separated with the end of the locking block and returns into the cavity.

6. The electronic device holder according to claim 5, characterized in that: the housing is provided with openings for the clamping arms and the adjusting arm to extend out; a plurality of second limiting blocks are provided in the housing; at least two second limiting blocks are arranged oppositely to form a space for the placement of the adjusting arm; and a second limiting block corresponding to the first limiting block is arranged to form a space for the placement of the clamping arm.

7. The electronic device holder according to claim 6, characterized in that: the second limiting block comprises a movement portion and a hook portion; the movement portion is connected with the sides of the clamping arm and the adjusting arm which have thickness dimensions; the hook portion is hooked on surfaces of the clamping arm and the adjusting arm which have width dimensions; two adjusting arms are provided, the two adjusting arms are overlapped, and the adjusting arm located at a lower position is provided with a guiding groove in a sliding direction, and the hook portion is clamped in the guiding groove.

8. The electronic device holder according to claim 1, characterized in that: the clamping arm and the adjusting arm connected to each other extend in opposite directions relative to the housing.

9. The electronic device holder according to any one of claim 1, characterized in that: two clamping arms are provided, the two clamping arms are slidably connected to the housing; and each clamping arm is connected with an adjusting arm correspondingly, each of two ends of the elastic element in its elastic direction is connected with a clamping arm.

10. The electronic device holder according to claim 1, characterized in that: one of the first housing and the second housing is provided with the connecting pillar, and the other of the first housing and the second housing is provided with a fastener; the fastener passes through the first housing or the second housing to connect with the connecting pillar.

11. The electronic device holder according to claim 1, characterized in that: the first housing and the second housing are provided with adjusting hooks with opposite bending directions; and the first housing and the second housing move to their respective extreme positions when the adjusting hooks of the first housing and the second housing are engaged.

12. The electronic device holder according to claim 1, characterized in that: the electronic device holder further comprises a support arm arranged at a bottom of the housing.

13. The electronic device holder according to claim 12, characterized in that: the support arm is slidably connected to the housing; the housing is provided with gear grooves and gear plates; the support arm comprises a main body, an adjusting plate provided on the main body, and a latching block provided on the adjusting plate; the adjusting plate can be pressed such that the main body abuts against different gear plates and the latching block is locked into different gear grooves to adjust the position of the support arm relative to the housing.

14. The electronic device holder according to claim 1, characterized in that: a buffering element is provided at a position where the clamping arm is connected to an electronic device.

15. The electronic device holder according to claim 1, characterized in that: the second housing is a rear housing, and a connecting element is provided on the second housing.

* * * * *